United States Patent
Lewin

(10) Patent No.: US 7,683,812 B2
(45) Date of Patent: Mar. 23, 2010

(54) PATTERN MATCHING APPARATUS

(75) Inventor: Andrew Charles Lewin, Malvern (GB)

(73) Assignee: QinetiQ Limited, London (GB)

( * ) Notice: Subject to any disclaimer, the term of this patent is extended or adjusted under 35 U.S.C. 154(b) by 0 days.

(21) Appl. No.: 12/086,179

(22) PCT Filed: Dec. 12, 2006

(86) PCT No.: PCT/GB2006/004638

§ 371 (c)(1),
(2), (4) Date: Jun. 19, 2008

(87) PCT Pub. No.: WO2007/068909

PCT Pub. Date: Jun. 21, 2007

(65) Prior Publication Data

US 2008/0258946 A1      Oct. 23, 2008

(30) Foreign Application Priority Data

Dec. 12, 2005    (GB) .................................. 0525229.1

(51) Int. Cl.
*H03M 9/00*    (2006.01)
(52) U.S. Cl. ....................................... 341/100; 341/101
(58) Field of Classification Search ................. 341/100, 341/101
See application file for complete search history.

(56) References Cited

U.S. PATENT DOCUMENTS 5,093,732 A * 3/1992 Yoshinaka ................. 386/91
5,140,618 A * 8/1992 Kinoshita et al. ........... 375/368
6,377,643 B1 * 4/2002 Lee et al. ..................... 375/368

FOREIGN PATENT DOCUMENTS

| EP | 0 460 604 | 12/1991 |
|----|-----------|---------|
| EP | 0 549 247 | 6/1993  |
| JP | 03219737  | 9/1991  |

OTHER PUBLICATIONS

International Search Report for PCT/GB2006/004638, mailed May 25, 2007.
Written Opinion of the International Searching Authority for PCT/GB206/004638, mailed May 25, 2007.
Great Britain Search Report for GB Application No. 0525229.1, dated Apr. 21, 2006.

* cited by examiner

*Primary Examiner*—Brian Young
(74) *Attorney, Agent, or Firm*—Nixon & Vanderhye P.C.

(57) ABSTRACT

This invention relates to a pattern recognition correlator implemented entirely in the electronic domain. The correlator has a serial to parallel conversion means to convert input serial binary data into at least one input parallel binary electrical signal and a comparator to compare the or each input parallel data signal with a reference parallel binary data signal. The serial to parallel conversion means may comprises a demultiplexer to effectively slow the data update rate and a series of latch circuits to provide the parallel data signal. The comparator may be arranged to perform bit addition and may be arranged such that a zero total sum is an indication of correlation. The bit addition may be performed b an array of logic gates.

13 Claims, 3 Drawing Sheets

PATTERN MATCHING APPARATUS

This invention relates to an electronic apparatus for pattern recognition, i.e. the correlation of search data with reference data, especially to an electronic apparatus for converting a temporal data stream into a parallel data pattern for the purpose of performing pattern matching.

Pattern recognition is concerned with the process of recognising one or more known objects in incoming data, for example text or imagery, by comparing known reference object(s) with the data. An ideal way to perform pattern recognition autonomously is through the mathematical operation of correlation.

There are many areas in which pattern recognition is used, from interrogating databases to locate specific search terms to biometric based recognition systems and target identification in two-dimensional imagery. Often the search is performed digitally using a suitably programmed processor to compare a known reference data string with the data to be searched to identify a match. One example is an internet search engine which compares one or more input reference words with internet data to identify a match.

When searching very large amounts of data however software based pattern identification techniques may be slow or require very large processing power. Also when data is received at high data rates, for example at telecommunications data transfer rates, software based systems may be unable to perform correlation at this speed.

Optical pattern recognition systems known as matched filters or correlators are also known and can be used to match spatial patterns. One of the earliest such schemes is the Vander Lugt optical matched filter described in A Vander Lugt, "Signal detection by complex spatial filtering", IEEE Trans. Inf. Theory IT-10, p 139-145 (1964). This system uses an optical arrangement to multiply the Fourier Transform of a scene with the conjugate Fourier Transform of a reference pattern before performing an inverse Fourier Transform on the combined pattern. If a strong correlation exists between the reference and the image a sharp bright peak is produced in the back focal plane of the system. Thus this system compares an observed image with a reference image and indicates if there is a correlation, and, if so, where it occurs—that is the system identifies the presence and location(s) of a target in a scene. More recent optical pattern recognition systems perform the Fourier Transforms (FTs) of the scene and reference pattern electronically and display the combined FTs on a spatial light modulator (SLM) thereby simplifying and speeding up the operation, see for example the correlator described in International Patent Application WO 00/17809. Such optical pattern recognition systems can work well for target identification in an observed scene etc. but for searching data repositories they require updating of an SLM with either the data to be searched or the combined data and reference pattern. Even with fast SLMs the update speed of the SLM limits the speed of correlation for the latter application. Note—as used herein the term correlator will be taken to include matched filters based systems.

Recently it has been proposed to apply the benefits of optical correlation to high speed pattern matching. Our co-pending patent applications PCT/GB2005/004028 and GB0423093.4 describes a correlator apparatus that uses fast phase modulation and parallel optical processing to allow high speed correlation.

FIG. 1 shows a first embodiment of this fast optical correlator. The correlator acts on a temporal or sequential input data stream 2. This data stream may be, for instance, in the form of an amplitude modulated binary optical signal such as is used in telecommunications and may be streamed from a database to be searched for the existence of certain data. The amplitude modulated input signal 2 is detected by a photodetector 4. The detected data is used to control a phase modulator 6 which modulates the phase of a stable laser 8 to create a temporal binary phase modulated optical signal. High speed phase modulators exist in the field of telecommunications and can deal with very high input data rates. However the data could be input in any form, for instance it may arrive as amplitude modulated electric signals and these may be used directly to control phase modulator 6.

The phase modulated optical data signal is divided into a plurality of optical channels. In this embodiment each optical channel comprises a length of optical fibre $14_1$-$14_N$ although other optical waveguides could be used. Each of the fibre optical channels has a different delay length, each fibre having an incremental delay compared to the previous fibre equal to the bit rate of the system. Thus at the output of the fibres 14 the first fibre will output the phase modulated signal equivalent to one particular bit whereas the next fibre, which has an increased delay, will output the phase modulated signal for the previous bit and so on. Therefore the output of each fibre will be a different bit in the signal. The apparatus therefore converts the temporal optical signal into a parallel optical phase signal. Optical delay means other than optical fibres can also be used.

The output of each fibre 14 is directed by a lens 28 onto part of a phase modulating spatial light modulator (SLM) 18. The spatial light modulator 18 displays a phase modulation pattern corresponding to at least one reference pattern (or its inverse)—the reference pattern corresponding to some reference data which is sought.

The phase of any one optical channel of the signal exiting the SLM will therefore be a combination of the phase modulation applied for that particular bit of input data and the phase modulation for that part of the reference pattern. Where there is no correlation between the input data and the reference data the phase of the various channels in the resulting optical signal will vary randomly and hence the signal will have a wavefront with varying phase. However, where the reference pattern exactly matches the input data the result will be that every optical channel has the same phase, in other words a plane wavefront will be produced.

The resulting optical signal is focussed by lens 20 to a point detector 22. In the case of no correlation the parts of the signal with one phase will destructively interfere with the opposite phase of the other channels (this is a binary phase system). Therefore the optical signal will not be strongly focussed to the detector 22. However where there is a correlation all the signal is in phase and hence the signal will be strongly focussed to the detector 22. Thus the intensity of the signal detected at the detector 22 can be used as an indication of correlation.

The SLM 18 may be arranged to display more than one reference pattern—this is useful where it is desired to search for more than one reference data string or where the search string is longer than the number of optical channels. In such a case the outputs of the fibre optics may be replicated into more than one parallel optical signal by replication optics 16. Imagine the outputs of the fibre optic delay lines 14 were arranged as a linear array. Replication optics 16, for instance a Dammann grating, may replicate the linear array of outputs in the transverse direction, i.e. a 40 channel array could be replicated 40 times to form a 40×40 array of outputs where each line is a copy of the parallel optical signal. These would be directed onto the SLM which would likewise be formed into a 40×40 array of modulation areas, each line representing a particular reference pattern.

The correlator apparatus described therefore effectively converts input sequential data into parallel optical data by dividing the signal into several optical channels which have successive delays. A reference phase modulation is also applied to each optical channel and when there is a correlation between the reference data and input data each channel will have the same phase which can be detected by interferometric coupling of the optical channels. This apparatus can therefore operate at high speeds as the reference data applied to the SLM or EO phase modulators is effectively fixed for a certain data pattern. However the high data rates involved still require phase modulators that can operate at the bit rate of the system. Also the final detector (or detectors) and associated processing circuitry need to operate at the bit rate of the system. The cost of such components is high and therefore there is a desire to reduce the bandwidth requirements where possible.

Further the use of optical components requires precise alignment and can require regular calibration and adjustment. For instance the fibre delays are temperature sensitive and changes in temperature can cause phase variations.

A pattern matching apparatus or correlator which operated entirely electronically and which could operate at very high input data rates, for instance 10-40 Gigabits per second or higher, would therefore be advantageous.

Thus according to the present invention there is provided a pattern matching apparatus comprising a serial-to-parallel conversion means for receiving an input serial binary data electrical signal and converting it to at least one input parallel binary data electrical signal having N channels and a comparator for comparing each channel of the input parallel signal with a channel of an N channel parallel reference binary data electrical signal and indicating when there is a pattern match.

The serial-to-parallel conversion means preferably comprises at least one 1:N demultiplexer. A demultiplexer is a known piece of equipment for performing a serial to parallel conversion and are sometimes known as serial-to-parallel converters. The demultiplexer has an input by which it receives the input data stream and N different outputs. The demultiplexer effectively stores bits as they are received until it is storing N bits, at which point it outputs a different one of the N stored bits on each of the N outputs. It then stores the next N bits from the input signal. In this way N bits of a temporal or serial input data stream are converted into a parallel data signal.

It will be apparent that the demultiplexer therefore only outputs a signal after it has received N bits and so the output rate from the demultiplexer is slower than the bit rate of the input data stream by a factor of N. Therefore whatever the bit rate of the input data the use of a demultiplexer reduces the subsequent update rate by a factor of N which eases system requirements and thus allows commercially available components to be used.

Most commercially available multiplexers (at the input data rates of interest, of the order of 10-40 Gigabits a second or possibly higher) tend to be limited to 1:4, 1:8 or 1:16 demultiplexers. Preferably commercially available demultiplexers are used and conveniently a 1:8 demultiplexer is used.

Eight parallel channels is generally not sufficiently high for useful pattern matching purposes and more channels are generally required. Preferably therefore each output of the 1:N demultiplexer is connected to a series of latch circuits, the latch circuits being clocked at the output rate of the demultiplexer and each latch circuit having an output channel. The latch circuits in effect form a shift register having a plurality of outputs. The effect of the series of latch circuits is to repeat the output on any particular channel at different delay times.

Thus the output from the demultiplexer on any particular output channel goes to the first latch circuit in the series. This is clocked at the output rate of the demultiplexer and on each clock pulse the data is both passed to the next latch circuit in the chain and also output to an output channel. Consider one particular output channel of the demultiplexer. At a time t0 the data on this output goes to the first latch circuit in the series and also to a first output channel. At the next clock time, t1, the value of the data stored in the first latch circuit is passed to the second latch circuit in the chain and also output on a second output channel. At the next clock time, t2, the value of the data is passed onto the next latch circuit and again passed to a different output channel. It can therefore be seen that on any one clock pulse the first latch circuit in the series is outputting the data value it holds, the second latch circuit is outputting the value of the previous data and so on. Thus the latch circuits act as a series of (clocked) delays in the electrical domain, acting in a similar manner to the fibre optic delays described above. A 1:8 demultiplexer could therefore be used with a series of four latch circuits on each of the eight outputs to give a 40 bit output.

It should be noted that for lower input data rates the use of a series of latch circuit offers the opportunity to provide a series of electrical delays, and hence perform serial to parallel conversion, without the need for a multiplexer. For instance a series of 39 latch circuits in series clocked at the actual bit rate, with tap points between each circuit, could convert a 40 bit long sequence into a parallel electrical signal directly. Therefore the serial-to-parallel conversion means may simply comprise a series of latch circuits, each latch circuit having an output channel.

However, as mentioned, at high data rates the latch circuitry may not be able to function that quickly and use of a demultiplexer reduces the clock rate at which the latch circuits and subsequent circuitry operate.

The serial-to-parallel conversion means therefore turns an input serial binary signal into a N channel parallel binary signal. This parallel signal is compared with an N channel reference signal. The reference signal corresponds to the data pattern sought and is unchanging until the desired search term changes. The apparatus may therefore comprise a N channel output memory means for storing the reference data pattern and outputting the appropriate binary value on each channel.

The comparator compares the binary value of each channel of the parallel input signal with the value on the relevant channel of the reference signal. The comparison could be done in various ways but preferably the comparison works by performing bit addition (which includes bit subtraction). It is a property of binary that for a single bit output the addition of the same binary value will result in zero and the addition of different binary values will result in the value one, i.e. binary 1+binary 1=binary 0, binary 0+binary 0=0. However a mismatch case leads to value 1: binary 1+binary 0=binary 1 and binary 0+binary 1=binary 1.

Therefore performing a logic combination on the data value of the input data for each channel with the relevant reference data will generate 0 where there is a match and 1 where there is no match.

The bit addition for each channel can be performed by using an Exclusive OR (XOR) logic arrangement to combine the values from the data and the reference signals.

Where there is a total match the combined result for each channel will be a zero. Thus detecting a zero output can be used as an indication of a pattern match. The zero could be detected in various ways. For instance further logic operations could be employed. In one embodiment a summing/difference or level detection circuit is used. The summing circuit may comprise a summing resistor connected to the output of every XOR gate and transimpedance amplifier (TIA) connected to all the summing resistors in parallel. A comparator arranged on the output of the TIA may generate a trigger signal when a zero result is detected.

The apparatus may be arranged to create more than one parallel data signal based on the input data so that the various parallel input signals can be compared with different reference patterns. There are various ways to achieve this. The input serial signal could be passed to several distinct apparatuses. Or the input signal could be turned into a parallel signal by the serial-to-parallel conversion means and then each channel passed to a plurality of comparators, each comparator comparing with a different reference pattern.

In some applications the data one is looking require several different reference data signals, i.e. what is be searched for in the input data is an occurrence of one particular reference pattern followed directly by another reference pattern. A particular search term may comprise several different reference patterns. For instance imagine that the pattern matching apparatus had 40 parallel channels. It the search term were 120 bits long this would be spread over three reference data signals. The apparatus may be adapted to only generate a match when reference pattern 1 appears followed by reference pattern 2 followed by reference pattern 3. Obviously the timing needs to be right to ensure that the patterns are matched from sequential data in the input serial data. Therefore a match for pattern 1 would need to be followed by a match for pattern 2 at a time later equal to 40 times the bit period.

The skilled person will appreciate that use of a demultiplexer means that the pattern matching apparatus only looks at certain snapshots of the data. For instance consider the case where a 1:8 demultiplexer is used, with latch circuits multiplying the number of channels to 40. When a serial signal is received the first full parallel signal will correspond to bits 1-40 of the input signal. As the demultiplexer only outputs at a rate of $\frac{1}{8}^{th}$ of the input bit rate these values will persist for a period which is eight times the bit period. After that time the outputs will change and the parallel signal will now correspond to bits 9-48 of the input signal. The next updated parallel signal will comprise bits 17-56 and so on.

The pattern matching apparatus as described including a demultiplexer will not therefore be able to generate a pattern match for a bit sequence which may appear in the input data but which doesn't correspond to a sequence that will be formed as a parallel signal. For instance continuing the example above if a reference pattern did actually match bit sequence 11-50 no match would be detected because no parallel signal corresponding to bits 11-50 would be formed.

However for several applications the data is not arbitrary and will be arranged in a meaningful form. The skilled person will appreciate that digital data is often transmitted in the form of bytes (8 bits of information) and that actually it would only be wished to search sequences which corresponded to full bytes of information. Finding a correlation between reference data and input data based on the end part of one byte and start of the next would be a false positive. Use of a demultiplexer therefore can ensure that only meaningful sequences of data are available for correlation and that every meaningful combination is presented. The demultiplexer and latch circuits are therefore preferably controlled by a byte boundary controller to ensure correct alignment.

Note that were a demultiplexer not used and instead the serial to parallel conversion was performed purely by a series of latch circuits then the parallel signal would be updated one bit at a time and every sequence of 40 bits (for a 40 channel device) would be considered.

The present invention therefore realises an all electronic pattern matching apparatus which is capable of operating at high data rates, say 10-40 Gigabits per second or more. As an all electronic device the apparatus could be implemented on a single chip, say as an ASIC.

The invention will now be described by way of example only with reference to the following drawings of which;

FIG. 1 shows a correlation apparatus as described in PCT/GB2005/004028 and GB0423093.4. The operation of this correlator has been described above.

FIG. 2 shows a pattern matching apparatus according to the present invention. Where similar components to the above mentioned optical correlator are used they are given the same reference numerals.

Figure 1:
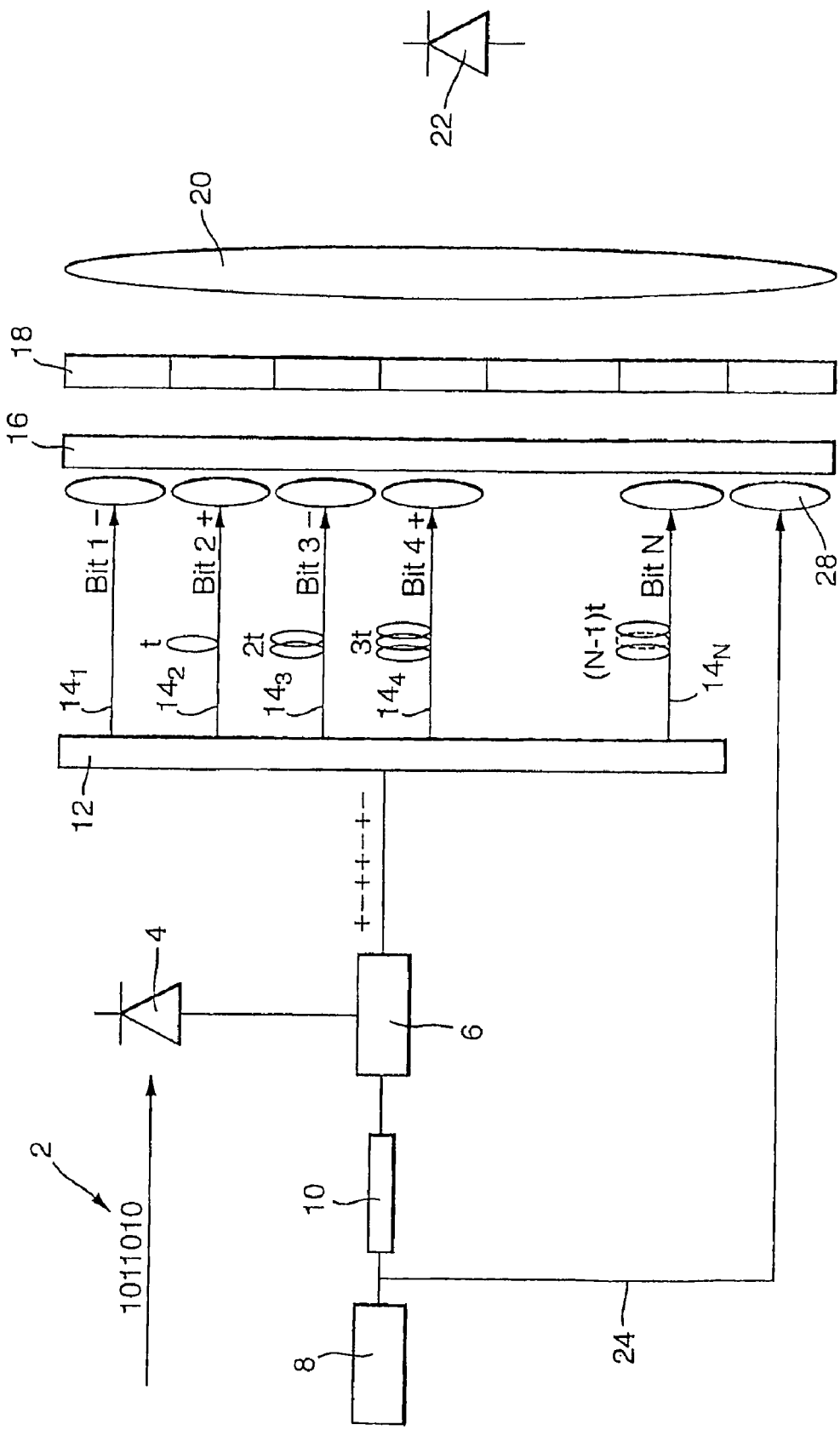
FIG. 1 shows an optical correlator as described in co-pending patent applications PCT/GB20051004028 and GB0423093.4.
Figure 2:
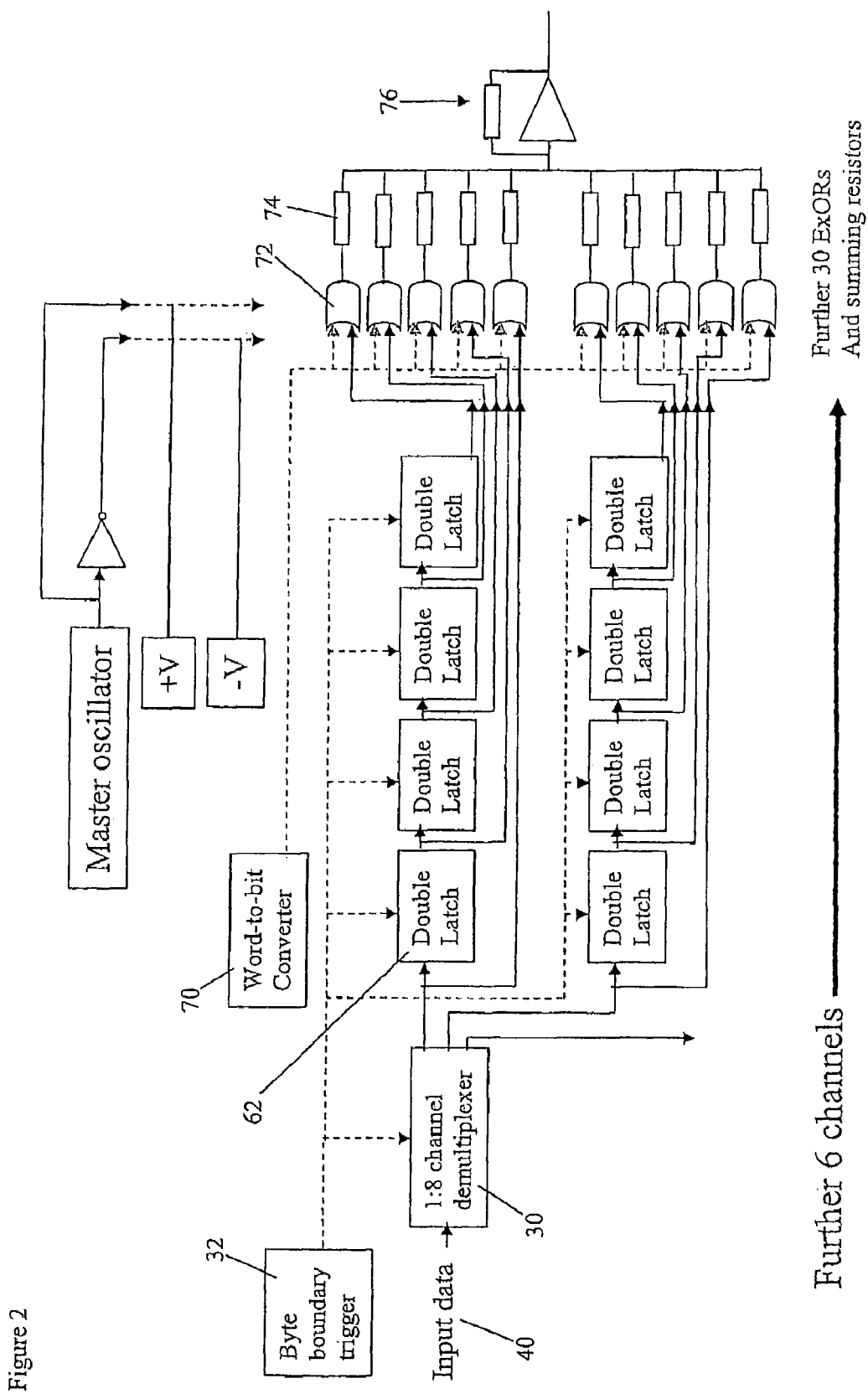
FIG. 2 shows an all electronic correlator according to the present invention.

An input data signal 40, in form of amplitude modulated electrical signals, is received by a 1:8 demultiplexer 30. The skilled person will be aware of demultiplexers that can be used for the particular requirement, e.g. Inphi 5081DX 50 Gbps 1:4 demultiplexer or Broadcom BCM8125 1:16 demultiplexer. The demultiplexer 30 is controlled by byte boundary trigger 32 to convert an eight bit byte in the series input data into an eight channel parallel data signal. Thus at a rate of one eighth of the bit rate of the input data the demultiplexer 30 outputs a different bit value on each of its eight output channels (note only three channels are shown for clarity).

Each output of the demultiplexer 32 is used to form one channel in the parallel electrical signal to be passed to the comparator and so is passed to one input of an exclusive OR (XOR) logic gate 72. Further each output of the demultiplexer 32 is also connected to the input of a series of four latch circuits $62_1$-$62_4$. Each latch circuit is connected to the next. Further the output of each latch circuit is also taken as another channel of the parallel signal and connected to the input of an XOR gate 72. The latch circuits 62 are also controlled by byte boundary controller 32 and the series acts as a shift register. The data value output from the demultiplexer is therefore rippled along the series. At any update time the data output from the demultiplexer is passed to the input of one of the XOR gates 72. At the same time the first latch circuit in the series for each channel will output the previous data to the input of a different XOR gate and the second latch circuit in each series will output the data previous to that and so on. Thus a 40 channel electrical signal is formed on the inputs of the 40 XOR gates 72.

The array of XOR gates form an input to the comparator which compares the value of the binary data on each channel of the parallel input signal with the binary value from a reference parallel signal.

The reference parallel signal is formed by word to bit convertor 70.

The correlation is performed on the basis of bit addition, i.e. the principle that if the particular bit in the input data matches the relevant reference bit the sum will be zero whereas if there is a mismatch the sum will be one. Thus for a complete match the sum of all the outputs from all the channels should be zero and a value of greater than zero is indicative of a mismatch.

It should be noted that the optical correlator described with reference to FIG. 1 operates by combining the optical power of the various optical channels and therefore benefits from the advantage that optical power is the square of the amplitude. This feature enhances the intensity difference between a perfect match and a near match.

For example consider a 40 channel optical system. If all channels have an amplitude of A at the combiner and are all in phase the resultant amplitude is 40 A but the optical power (which is what is measured) is $(40\,A)^2$. If only one bit were to be the opposite phase the resultant amplitude would be 38 A (the one bit would not only not contribute but destructively interfere) but the power would be $(38\,A)^2$. The case of one bit incorrect therefore approximately 10% down in optical power as compared with a complete match. Thus working by using power gives an advantage in distinguishing a near match from a match.

It would be possible to generate the same effect by using the coherent combination of AC waves. Alternatively direct summation of DC currents could be used (but obviously without any benefits of the squaring function). However bit addition is not only simple to implement but has the advantage that the match case occurs at zero output. For the optical correlator mentioned the match case is at maximum intensity and so a threshold is needed. This is sensitive to noise in the system. Bit addition is binary and drifts in the DC voltage corresponding to a 1 would be almost irrelevant provided zero is a true zero.

The bit addition is performed by the XOR logic arrangements 72. An XOR gate outputs a value 1 when either one, but not both, of the inputs is value 1. In other words the truth table is;

TABLE 1

|   | 1 | 0 |
|---|---|---|
| 1 | 0 | 1 |
| 0 | 1 | 0 |

This gives the required result that when the both inputs to the XOR gate match, i.e. the relevant bit in the input data matches the relevant bit in the reference data, the output is zero but when there is no match the output is one.

The output of each XOR gate 72 is therefore zero for the perfect match case. An instance of a zero on each output is detected using a summing/difference circuit. The output of each XOR gate 72 is connected to a summing resistor 74 and peak/dip detection circuit 74 detects a zero sum.

Figure 3:
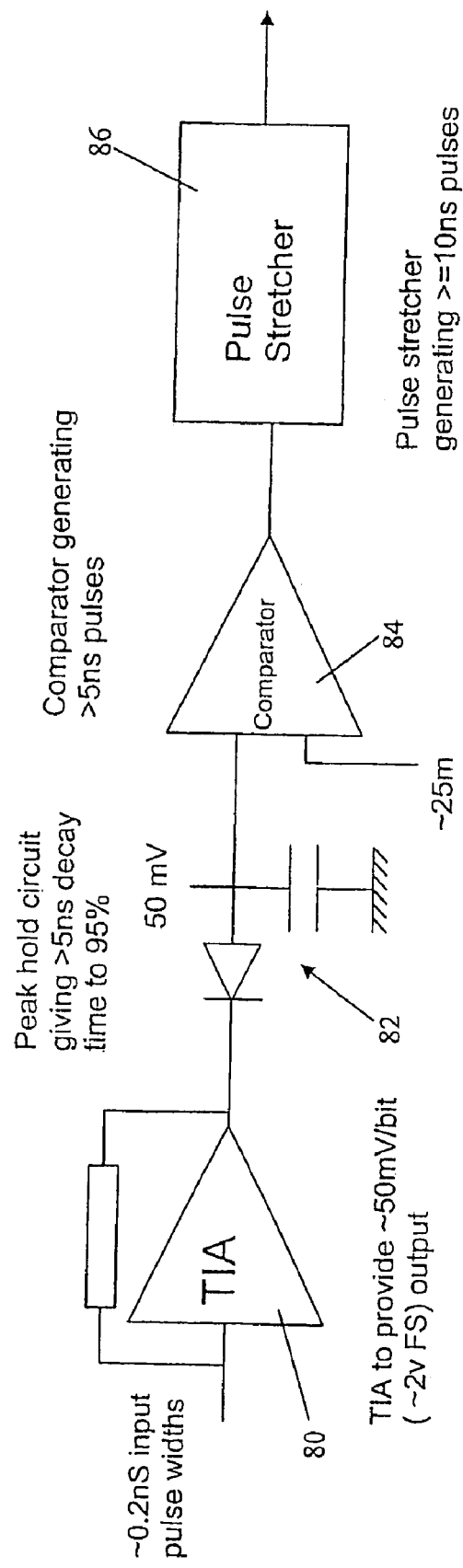
FIG. 3 shows a suitable peak/dip detection circuit.

Peak/dip detection circuit 74 is shown in more detail in FIG. 3. The combined input from all XOR gates 72 is input to transimpedance amplifier 80 and resistor 82. The output from the TIA goes to peak holding circuit 82 and comparator 84. This circuit is arranged to trigger on a zero sum indicating a perfect match.

It is expected that the "hit rate" will be far below the input data rate, and also that some longer pattern lengths will need to be searched for. On detection of a 100% match (zero-difference), the "pulse stretcher" 86 is designed to hold the output high for a length of time corresponding to a "data page length" in which other strings may also be detected. External delays may be arranged to ensure that this flag is actually held high both before and after detection of the first match, to enable an overlap to occur between it and a similarly stretched pulse corresponding to another string being sought.

The above described "search engine on a chip" could search for a small number (maybe just 1 per module) of strings at very high rates, but output a flag in the form of a pulse starting possibly before and remaining until some time after detection of the match. This much reduced bandwidth signal can easily be combined with other electronic signals from the other parallel channels to flag the occurrence of a group of sought after strings in a region defined as the "data page length".

As this technology can be realised on an ASIC style chip, parallel processing of many channels is possible.

The invention claimed is:

1. A pattern matching apparatus comprising:
   a serial-to-parallel converter comprising at least one 1:N demultiplexer for receiving an input serial binary data electrical signal and converting it to at least one input parallel binary data electrical signal having N channels, wherein an output of each of said at least one 1:N demultiplexer is connected to a series of latch circuits, the latch circuits being clocked at the output rate of the demultiplexer and each latch circuit having an output channel; and
   a comparator for comparing each channel of the input parallel signal with a channel of an N channel parallel reference binary data electrical signal and indicating when there is a pattern match.

2. A pattern matching apparatus as claimed in claim 1 wherein the demultiplexer is a 1:4, 1:8 or 1:16 demultiplexer.

3. A pattern matching apparatus as claimed in claim 1 wherein the serial-to-parallel conversion means comprises a series of latch circuits, each latch circuit having an output channel.

4. A pattern matching apparatus as claimed in claim 1 comprising a N channel output memory means for storing the reference data pattern and outputting the appropriate binary value on each channel.

5. A pattern matching apparatus as claimed in claim 4 wherein the comparator compares the binary value of each channel of the parallel input signal with the value on the relevant channel of the N channel output memory.

6. A pattern matching apparatus as claimed in claim 1 wherein the comparator comprises a means for performing bit addition of the value of each channel of the input parallel signal with the value of a channel of the parallel reference signal.

7. A pattern matching apparatus as claimed in claim 1 wherein the comparator comprises an Exclusive OR (XOR) logic arrangement to add the values from the input data and the reference data for each channel.

8. A pattern matching apparatus as claimed in claim 7 wherein a summing/difference circuit sums the output from each XOR logic arrangement.

9. A pattern matching apparatus as claimed in claim 8 wherein the summing circuit comprises a summing resistor connected to the output of every ExOR gate and transimpedance amplifier (TIA) connected to all the summing resistors in parallel.

10. A pattern matching apparatus as claimed in claim 9 comprising a comparator arranged on the output of the transimpedance amplifier arranged to generate a trigger signal when a zero result is detected.

11. A pattern matching apparatus as claimed in claim 1 arranged to create more than one parallel data signal based on the input data so that the various parallel input signals can be compared with different reference patterns.

12. A pattern matching apparatus as claimed in claim 1 comprising a byte boundary controller.

13. An integrated circuit comprising a pattern matching apparatus as claimed in claim 1.

\* \* \* \* \*